(12) United States Patent
Hnizdor

(10) Patent No.: US 6,185,857 B1
(45) Date of Patent: Feb. 13, 2001

(54) TEASER SCHOOL FISHING APPARATUS

(76) Inventor: Thomas A. Hnizdor, 9164 Brady, Redford, MI (US) 48239

( * ) Notice: Under 35 U.S.C. 154(b), the term of this patent shall be extended for 0 days.

(21) Appl. No.: 09/313,061

(22) Filed: May 17, 1999

Related U.S. Application Data

(60) Provisional application No. 60/085,787, filed on May 18, 1998.

(51) Int. Cl.⁷ .................................................... A01K 85/00
(52) U.S. Cl. ............................................................ 43/42.11
(58) Field of Search ............................... 43/42.11, 42.15, 43/42.36

(56) References Cited

U.S. PATENT DOCUMENTS

| | | | |
|---|---|---|---|
| 3,186,120 | * | 6/1965 | Layson ................................. 43/42.14 |
| 4,794,721 | * | 1/1989 | Rowe, Jr. et al. ................... 43/42.14 |
| 5,862,623 | * | 1/1999 | MacPherson ......................... 43/42.24 |

* cited by examiner

*Primary Examiner*—Thomas Price
(74) *Attorney, Agent, or Firm*—Young & Basile, PC

(57) ABSTRACT

A fishing artificial fly apparatus includes a primary fish line having a hook attached to one end. At least one secondary member is mounted on the primary line spaced from the hook. At least one branch line is attached to the primary line and spaced from the hook. At least one secondary member is mounted on the branch line. In one aspect, the secondary members are formed of first and second attractor fish shaped members joined together about the primary or branch line. In another aspect, the secondary members include a disk formed with decorative indicia or with two decorative sheets having an attractor fish shape affixed to opposite sides of the disk.

15 Claims, 2 Drawing Sheets

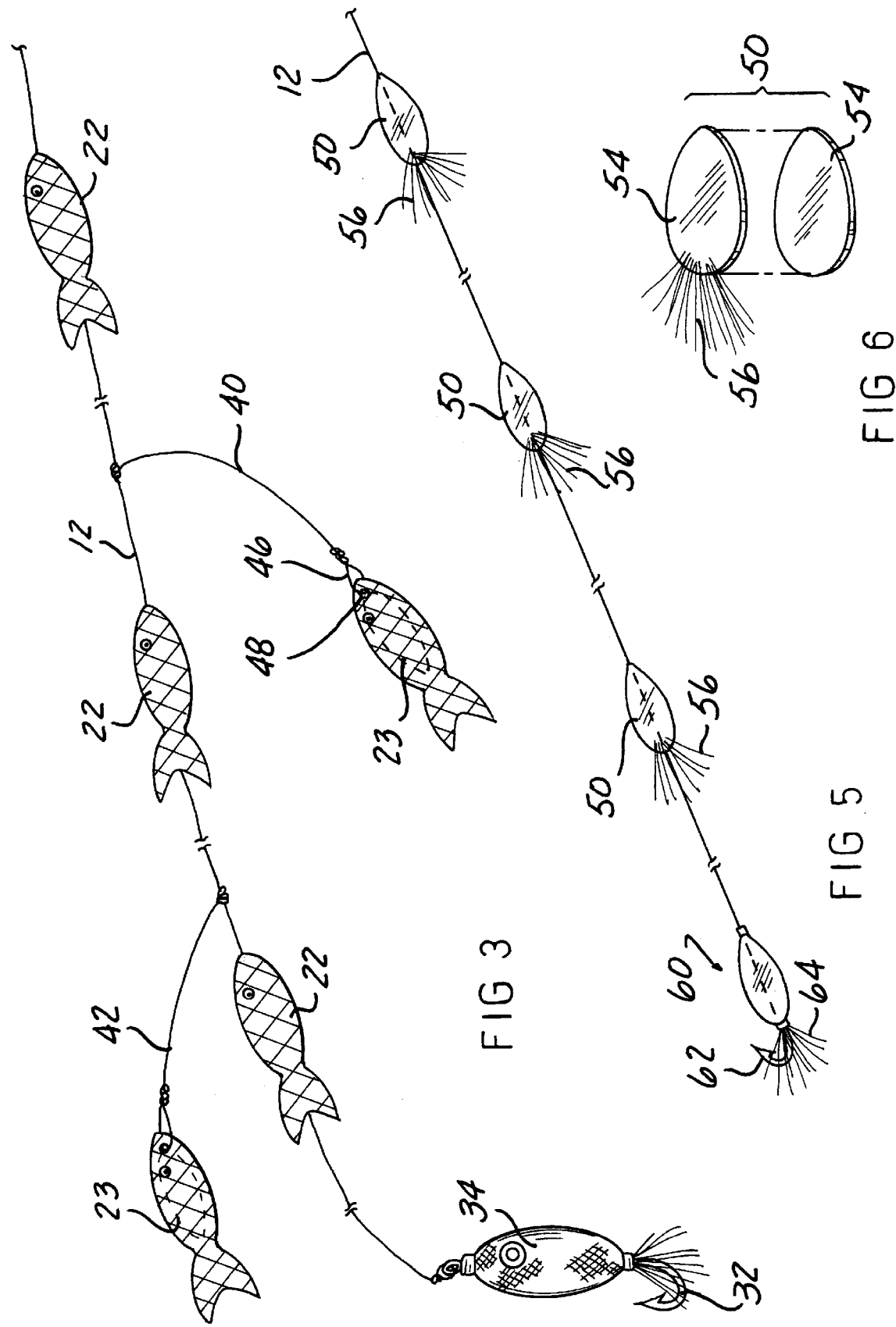

TEASER SCHOOL FISHING APPARATUS

CROSS REFERENCE TO CO-PENDING APPLICATION

This application claims the benefit of the filing date of co-pending, provisional U.S. patent application Ser. No. 60/085,787, filed May 18, 1998, in the name of Thomas A. Hnizdor and entitled "Teaser School Artificial Fly Apparatus".

BACKGROUND OF THE INVENTION

1. Field of the Invention

The present invention relates, in general, to fishing equipment and, more specifically, to artificial flies and lures.

2. Description of the Art

Artificial flies and lures are widely used in the sport of fishing as they have proven to be excellent attractors and bait fish imitators for most varieties of fish. In the case of artificial flies, a fly simulating a natural fly, insect or small bait fish is mounted on a hook which is in turn connected to a leader line. Such flies may include a buoyant body, feathers, combinations of a buoyant body and feathers, etc.

It is also known when using spinning gear to place two lures, each mounted on or carrying one or more hooks in tandem end to end, with a short line or cable extending from the eye of the second hook is tied to the first hook.

However, it would be desirable to provide a unique approach to attracting fish to a fly line and hook by simulating a school of fish. It would also be desirable to provide such an apparatus while still maintaining a light weight necessary for fly casting.

SUMMARY OF THE INVENTION

The present invention is fishing apparatus which presents a teaser or simulated school of fish like appearance to fish.

In one aspect of the invention, the fishing apparatus comprises a primary fishing line having a hook attached to one end and an artificial fly or lure associated with or mounted over the hook. At least one secondary artificial fly or lure member is spacedly mounted on the primary line with respect to the hook. Preferably, a plurality of secondary members are spacedly mounted along the primary line in a serial fashion.

Each of the secondary members, in one aspect of the invention, are formed of first and second thin, sheet-like, bait fish shaped members joined together about the line.

In another aspect of the invention, at least one and, preferably, a plurality of branch lines are attached to the primary line and spaced along the primary line with respect to the hook. At least one secondary member is mounted on each branch line.

In this aspect of the invention, the secondary member is formed of a disk attached to the branch line. Two decorative sheets having an attractor or bait fish shape are fixed to opposite sides of the disk. The disk and the two sheets are attached to the end of the branch line 40 or 42.

The fishing apparatus of the present invention provides a unique school-like affect of artificial flies or lures on a single primary fishing line for increased attractiveness to fish. The secondary, non-hook bearing, artificial fly or lure members affixed to the primary line and on each branch line may take any of a number of bait fish, lure or fly shapes.

BRIEF DESCRIPTION OF THE DRAWING

The various features, advantages, and other uses of the present invention will become more apparent by referring to the following detailed description and drawing in which:

FIG. 3 is a pictorial representation of a second embodiment showing a parallel teaser school fishing apparatus according to the present invention;

FIG. 5 is a pictorial representation of another embodiment of a teaser school fishing apparatus using a different teaser member and a different fly; and FIG. 6 is an exploded perspective view of one of the teaser members shown in FIG. 5.

DESCRIPTION OF THE PREFERRED EMBODIMENTS

Figure 1:
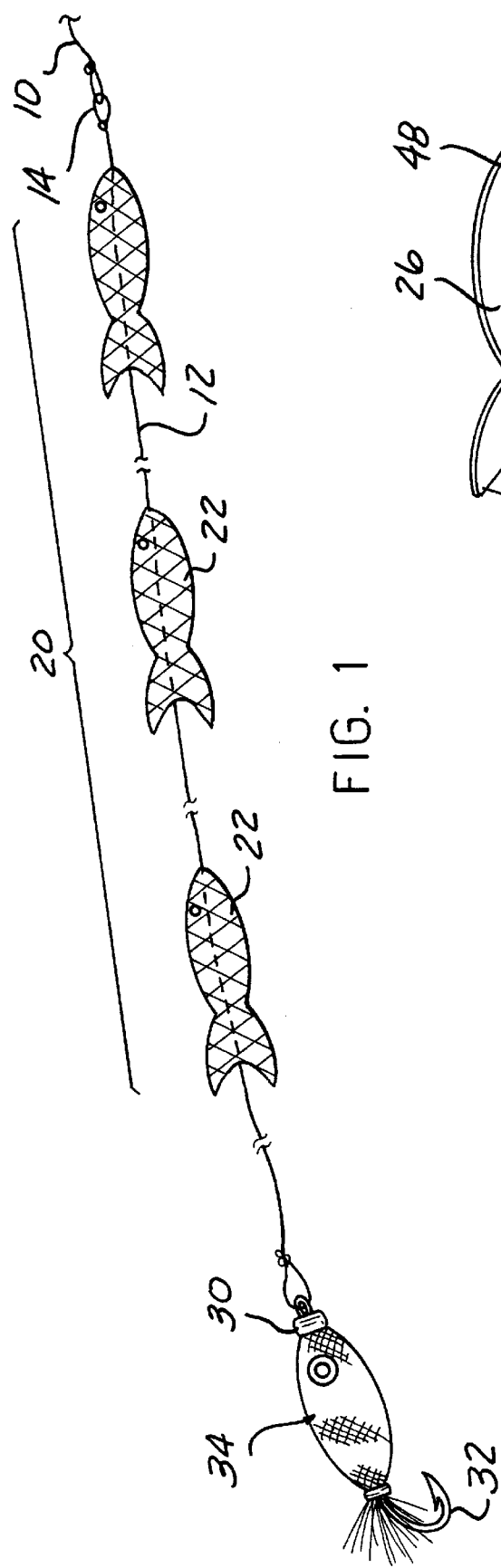
FIG. 1 is a pictorial representation of one embodiment of a serial teaser school fishing apparatus according to the present invention.
Figure 2:
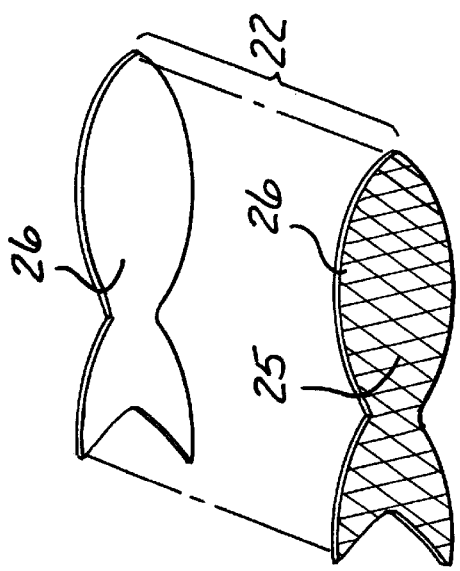
FIG. 2 is an exploded, perspective view of one of the teaser members shown in FIG. 1.

Referring now to the drawing, and to FIGS. 1 and 2 in particular, there is depicted a first embodiment of a teaser school fishing apparatus according to the present invention.

Although an artificial fly and fly shaped teaser members are depicted and described hereafter as an example of one embodiment of the invention, it will be understood that the present invention is equally usable with conventional, non-fly, fishing equipment, such as spinning or trolling gear, for example. Further, in the following description the terms "artificial fly" and "lure" will be understood to be interchangeable.

As is conventional, a fly line 10 is tied or otherwise connected to a compound tapered leader or a knotted taper leader or primary line 12. Any suitable tie connection or knot 14 may be employed to connect the leader 12 to the fly line 10. The tieing arrangement 14 may include forming one end of the fly line 10 in a loop to which one end of the leader 12 is tied. Alternatively, one end of the leader 10 may be tied to a conventional swivel to which the secondary line 12 is also tied.

In the case of spinning or trolling gear, the leader or primary line 12 can be attached to the main line from the rod and reel, with any lure attached to the end of the primary line by a knot, swivel, etc.

The apparatus in the first embodiment shown in FIG. 1 is arranged serially in a school denoted generally by reference number 20 and is formed of at least one and preferably a plurality of hookless, secondary or teaser members, all denoted by reference number 22. Although, in a preferred embodiment, all of the teaser members 22 mounted on the leader 12 are identically constructed, it will be understood that the individual teaser members 22 may be provided in different variations, shapes, colors, etc. Further, any number of teaser members 22 may be employed depending upon the particular fishing conditions, casting skill of the fisherman, etc.

As shown in FIG. 2, each teaser member 22 is formed of a pair of decorative sheets or tapes, such as decorative tapes 26 which are cut or formed into a fly, bait fish, or lure shape. Preferably, each decorative tape 26 is adhesive backed so as to be easily joined to the opposite tape 26. More, preferably, a reflective tape 26 is employed which has iridescent colors on a reflective background and/or an exterior design 25. Such a tape 26 is typically formed of mylar with an adhesive backing. Separate adhesive may also be employed to join two non-adhesive backed decorative sheets or tapes 26.

When constructing each teaser member 22, one of the decorative tapes 26 is placed at a predetermined position next to the leader 12. The other decorative tape 26 is then joined to the first tape 26 trapping a portion of the leader or primary line 12 therebetween.

In this manner, each teaser member 22 is easily mounted at any desired position along length of the leader 12 in a secure manner which resists separation of the teaser members 22 from the leader 12 during casting and when pulled through the water. The teaser members 22 may be mounted at any spacing along the length of the leader 12. Although an equal spacing is shown in FIG. 1, it will be understood that the spacing between successive teaser members 22 along the leader 12 may be unequal.

As shown in FIG. 1, the end of the leader 12 opposite from the end attached to the fly line 10 is secured or tied to the eye 30 of a fish hook 32. The end of the leader 10 is preferably tied to the eye 30 by using a conventional knot. An artificial fly 34 is mounted on the hook 32. Any suitable artificial fly 34 may be employed in the teaser school apparatus shown in FIG. 1. Preferably, however, the shape of the artificial fly 34 closely matches the shape of the teaser members 22 so as to give an overall appearance of a school of the same species of fish.

The teaser school fishing apparatus shown in FIG. 1 is employed in the same manner as a conventional single fly insofar as casting, pulling through the water, etc. When the teaser school apparatus is drawn through the water, the plurality of the teaser members 22 ahead of the artificial fly 34 on the hook 32 gives the appearance of a school of fish in a single file line thereby creating a greater attraction to an actual fish to cause the fish 32 to strike the last artificial fly 34 thereby engaging the hook 32.

FIG. 3 depicts a parallel arrangement of a teaser school apparatus according to the present invention. In this embodiment, the leader 12 is still tied to a fly line 10, not shown. As in the first embodiment shown in FIG. 1, the same shaped plurality of teaser members 22 are and mounted in a spaced apart relationship along the leader 12. The artificial fly 34 and the hook 32 is also mounted on the end of the leader 12.

In this embodiment, at least one and, preferably, two or more secondary or branch lines or outriggers 40 and 42 are tied at spaced locations to the leader 12, such as between two adjacent teaser members 22. Each branch line 40 and 42 is securely affixed to the leader 12 by a suitable knot. Epoxy or other adhesive may be applied about the knot to securely retained each branch line 40 and 42 on the leader 12.

The opposite end of each branch line 40 and 42 carries a hookless, secondary, teaser member 23 identically shaped as the teaser members 22 adhesively mounted on the leader 12. Although the teaser member 23 may be adhesively mounted on the end of the branch lines 40 and 42, by way of example, one end of each branch line 40 and 42 is tied to itself to form a loop 46. The loop 46 extends through an aperture 48 formed in the head end of the teaser member 23 to mount the teaser member 23 to the end of each branch line 40 or 42. One or more teaser members 22 may be affixed to each branch line 40 or 42 between the connection to the leader 12 and the teaser member 23. Alternately, multiple teaser members 23, each carried on a short branch line connected to one branch line 40 or 42 is also possible.

Figure 4:
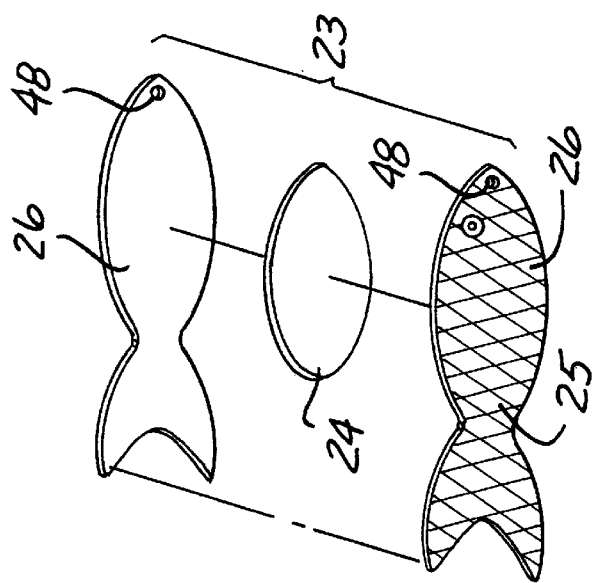
FIG. 4 is an exploded, perspective view of another embodiment of a teaser member used in the embodiment of FIG. 3.

As shown in FIG. 4, by way of example, each teaser member 23 is formed of a thin, flexible, disk-shaped member 24. The member 24 may take any shape, such as the shape of a small bait fish or an oval as shown in FIG. 4. Any suitable lightweight material may be employed to form the member 24, such as a lightweight plastic. The member 24 is provided on both opposed major surfaces with a suitable color and/or marking 25 which makes the member 24 more attractive as a bait fish imitator. Such colors, stripes, patterns or other markings may be formed on the member 24 by any conventional means, such as by color marker, paint, integral molding, etc.

Alternately, at least one and, preferably, a pair of decorative tapes 26 are joined to the member 24. Preferably, but not absolutely necessary, each decorative tape 26 is formed to the same shape as the member 24. Alternately, as shown in FIG. 4, the disk-shaped member 24 may have a more oval shape without a tail at one end. An aperture, not shown, may be formed in the member 24 adjacent the head end for tieing to one branch line. The decorative tape 26 may then be provided in the shape shown in FIG. 4 with an aperture in one end of the tape aligned with the aperture in the member 24 or with a like aperture in the opposed decorative tape 26. The opposite end of each tape 26 has a typical tail shape and may extend outward beyond one end of the member 24 and joined to the similarly constructed, opposed decorative tape 26.

When the parallel teaser school apparatus is drawn through the water, the branch lines 40 and 42 extend outward to the sides of the leader 12. Due to the force pulling the entire leader 12 and fly line 10 through the water, the ends of the branch lines 40 and 42 will bend until they are substantially parallel to, but spaced from the leader 12 thereby placing all of the teaser members 22 and 23 in a generally parallel, two or three dimensional configuration similar to that of a conventional school of fish.

Referring now to FIGS. 5 and 6, there is depicted an embodiment similar to that of FIG. 1, but with a different shaped and constructed fly 60 and different shaped teaser members 50. In this embodiment, each teaser member 50 is formed of two joined teardrop shaped, decorative tapes 54. Preferably, the two tapes 54 are adhesively joined together. One of the tapes 54 is joined to the leader 12 before the other of the decorative tapes 54 is adhesively joined to the first tape 54 to fixedly mount each teaser member 50 to the leader 12.

In this embodiment, each teaser member 50 also carries a stranded tail 56 formed by a plurality of thin, flexible strands, such as strands of mylar tinsel known commercially as "flashabou". These strands are adhesively affixed to the tail end of the decorative tapes 54 through an adhesive backing on the decorative tapes 54.

The artificial fly 60 mounted on the distal end of the leader 12 also has a shape similar to that of the teaser members 50. By way of example only, the artificial fly 60, which is mounted on a hook 62 and includes a stranded tail 64 similar to the tail 56 on each teaser member 50, is formed in a spoon-like shape such as that sold commercially as "Keel-Spoon" and "Keelflirt", both trademarks of B-17 Fly Tackle, Limited, Redford, Mich.

In summary, there has been disclosed a unique fishing apparatus which includes secondary or teaser members mounted along the primary fishing line between a leader line and a primary artificial fly or lure and hook as well as on branch lines spaced along the primary line. The fishing apparatus of the present invention uniquely creates a simulated school of fish which can be advantageously employed to attract larger game fish.

What is claimed is:

1. A fishing apparatus comprising:

a primary fishing line;

a hook attached to one end of the primary line; and a plurality of secondary artificial members spacedly mounted on the primary line and spaced from the hook, the plurality of secondary members serially spaced end-to-end along the primary line, and each secondary member including first and second members joined together and trapping the primary line therebetween.

2. The fishing apparatus of claim 1 further comprising:

at least one branch line attached to the primary line and spaced from the hook.

3. The fishing apparatus of claim 2 further comprising:

at least one secondary member mounted on the branch line.

4. The fishing apparatus of claim 2 further comprising:

a plurality of branch lines spacedly attached to the primary line.

5. A fishing apparatus comprising:

a primary fishing line;

a hook attached to one end of the primary line; and at least one secondary artificial member mounted on the primary line spaced from the hook, the secondary member including first and second members joined together and trapping the primary line therebetween.

6. The fishing apparatus of claim 5 wherein:

the first and second members are adhesively joined together about the primary line.

7. A fishing apparatus comprising:

a primary fishing line;

a hook attached to one end of the primary line;

at least one secondary artificial member mounted on the primary line spaced from the hook;

at least one branch line attached to the primary line and spaced from the hook;

at least one secondary member mounted on the branch line, the at least one second arm member mounted on the branch line including:
a disk attached to the branch line; and
decorative indicia on the sides of the disk.

8. A fishing apparatus comprising:

a primary fishing line;

a hook attached to one end of the primary line;

at least one secondary artificial member mounted on the primary line spaced from the hook;

at least one branch line attached to the primary line and spaced from the hook;

at least one secondary member mounted on the branch line, the at least one secondary member mounted on the branch line including:
a disk; and
two decorative sheets having a fish attractor shape affixed to opposite sides of the disk.

9. The fishing apparatus of claim 8 further comprising:

an aperture formed in one of the disk and the decorative sheets, the branch line extending through the aperture to attach the secondary member to the branch line.

10. A fishing apparatus comprising:

a primary fishing line;

a hook attached to one end of the primary line; and a plurality of secondary members serially spaced along and mounted to the primary line, each of the secondary members including first and second, identical, fish attractor shaped members joined together about the primary line.

11. The fishing apparatus of claim 10 further comprising:

at least one branch line attached to the primary line and spaced from the hook; and at least one secondary artificial fly member mounted on the branch line.

12. The fishing apparatus of claim 11 wherein the secondary member comprises:

a disk attached to the branch line; and decorative indicia on the sides of the disk.

13. The fishing apparatus of claim 11 wherein the at least one secondary member comprises:

a disk; and two decorative sheets having an attractor fish shape affixed to opposite sides of the disk.

14. The fishing apparatus of claim 13 further comprising:

an aperture formed in one of the disk and the decorative sheets, the branch line extending through the aperture to attach the secondary member to the branch line.

15. The apparatus of claim 10 further comprising:

a plurality of branch lines spacedly attached to the primary line.

\* \* \* \* \*